United States Patent [19]

Wallace

[11] Patent Number: 4,538,821
[45] Date of Patent: Sep. 3, 1985

[54] MECHANICAL SEALS
[75] Inventor: Neil M. Wallace, Stockport, England
[73] Assignee: Flexibox Limited, Manchester, England
[21] Appl. No.: 555,880
[22] PCT Filed: Mar. 28, 1983
[86] PCT No.: PCT/GB83/00093
 § 371 Date: Nov. 18, 1983
 § 102(e) Date: Nov. 18, 1983
[87] PCT Pub. No.: WO83/03454
 PCT Pub. Date: Oct. 13, 1983

[30] Foreign Application Priority Data
 Apr. 2, 1982 [GB] United Kingdom ............... 8209790

[51] Int. Cl.³ .............................................. E16J 15/34
[52] U.S. Cl. .................. 277/81 R; 277/93 R
[58] Field of Search .................. 277/81 R, 93 R, 87

[56] References Cited
U.S. PATENT DOCUMENTS

| | | | |
|---|---|---|---|
| 2,590,759 | 3/1952 | Dale et al. ........................... | 277/93 |
| 2,797,940 | 7/1957 | Michener, Jr. et al. | |
| 3,099,453 | 7/1963 | Dunn et al. ........................ | 277/27 |
| 3,578,803 | 5/1971 | Huhn .................................. | 277/93 |
| 3,705,728 | 12/1972 | Millar ............................... | 277/81 R |
| 3,719,226 | 3/1973 | Vallance ........................... | 277/81 R |
| 3,953,038 | 4/1976 | Ludwig .............................. | 277/93 R |
| 4,175,753 | 11/1979 | Wentworth, Jr. .................. | 277/87 |
| 4,272,084 | 6/1981 | Martinson et al. ............... | 277/93 R |
| 4,377,290 | 3/1983 | Netzel ............................... | 277/93 R |
| 4,410,188 | 11/1983 | Copes ............................... | 277/93 R |

FOREIGN PATENT DOCUMENTS 1511050 5/1978 United Kingdom .

OTHER PUBLICATIONS

*Hydrocarbon Processing*, vol. 62, No. 1, Jan. 1983, (Houston, Texas), H. P. Bloch, "Selection Strategy for Mechanical Shaft Seals", pp. 75–81, see p. 79, left-hand column, paragraph 3–p. 80, left-hand column, paragraph 1; FIG. 6.

Primary Examiner—Robert I. Smith
Attorney, Agent, or Firm—Bacon & Thomas

[57] ABSTRACT

A mechanical seal for a shaft (1) existing a housing (12) has an end plate (22) secured to the housing and a sleeve (26) secured to the shaft. The sleeve (26) carries a rotary seal element (40) and the end plate a stationary seal element (52) which form a running seal at faces (48,50). A multipurpose bush (60) is a close fit on the sleeve (26), it positions a spring (64) pressing the seal elements (40,52) together, it caries a lipseal (78) and it prevents collar (30) securing the sleeve (26) to the shaft (10) from contacting the end plate (22) in the event that the sleeve becomes unsecured from the shaft (110). The bush (60) is constructed from spark resistant material. A removable key (88) positions the sleeve (26), and hence the seal elements (40,52) and bush (60) with respect to the end plate (22) prior to tightening sleeve-security screws (32).

17 Claims, 5 Drawing Figures

MECHANICAL SEALS

TECHNICAL FIELD

This invention relates to mechanical seals of the type employed to seal a rotary shaft exiting a housing containing fluid, usually under pressure, to be retained within the housing.

The invention particularly relates to cartridge-type mechanical seals supplied as a preassembled unit and adapted to be positioned over the shaft. An end plate thereof is then simply bolted to the housing and a sleeve secured to the shaft.

BACKGROUND ART

Seals of these types are disclosed in a number of patent specifications of which U.S. Pat. No. 3,051,498 and British Pat. Nos. 1465069, 1471891 and 1471892 are examples. It is an object of this invention to improve existing designs.

DISCLOSURE OF INVENTION

In accordance with this invention there is provided a mechanical seal adapted to seal a rotary shaft exiting a housing containing a fluid product to be retained inside the housing, the seal comprising (i) a sleeve adapted to be sealed and secured around the shaft and extending out of the housing;

(ii) an annular rotary seal element carried by said sleeve;

(iii) an end plate adapted to surround the sleeve and be sealed and secured to the housing;

(iv) an annular stationary seal element carried by said end plate; and (v) means urging said seal elements into contact at opposed annular seal surfaces to form a running seal therebetween, characterised in that, (vi) an annular bush is disposed in the end plate outside of said seal elements and which is a close fit on the sleeve to staunch any leak between said seal elements.

This bush forms the basis for a number of features which can simply be incorporated into the seal as desired without requiring greater complication of the design of the seal.

Thus it is preferable if the bush is so disposed in the end plate that in the event that the sleeve becomes unsecured from the shaft a flange on the sleeve abuts the bush and is prevented from contacting the end plate, the bush being constructed from a spark resistant material. Where the product is flammable it is essential that the possibility of sparking is reduced to a minimum. The bush being constructed from bronze or some such other spark resistant material reduces the possibility of sparking occurring either through its own continuous rubbing on the sleeve or more especially through the sleeve working loose in time and contacting the end plate under the influence of said urging means.

Preferably said means urging said seal elements into contact comprises a spring carried and positioned by said bush and acting on said stationary seal element. Thus the bush can also serve as a spring carrier to locate the spring relatively to the stationary seal elememt.

Moreover said bush is prevented from rotating with respect to the end plate and interlocks with the stationary seal element preventing said stationary seal element from rotating with respect to the bush.

Some form of antirotation device is always required for the stationary seal elememt and this provides a simple solution. Preferably a pin extends through the end plate and engages a slot in the bush whereby the bush is prevented from rotating.

Said bush may carry a lipseal adapted to seal the small gap between the bush and the sleeve and the bush is itself sealed to the end plate.

Moreover the space defined between the end plate and sleeve and between the seal elements and bush is adapted to be filled with a quenching medium supplied through a port formed in the end plate and drained through another port also formed in the end plate.

The quenching medium is circulated on the outside of the seal elements and serves to cool them and also wash away any fluid product leaking through the seal elements. Ports formed in the end plate may also be employed to circulate the fluid product around the inside of the seal elements so as to quench them and also to keep that area of the housing free from debris which could adversely affect the operation of the seal.

The bush may be sealed to the end plate by an O-ring disposed between substantially cylindrical surfaces of the end plate and bush. Preferably said O-ring is disposed in a circumferential groove in the bush.

On the other hand said bush maybe a loose fit in a bore of the end plate enabling it to float in the end plate in response to radial movement of the sleeve. The bush can then be arranged as a still closer fit on the sleeve without the fear of sleeve "pick-up" if the shaft should rotate eccentrically about its axis or if the end plate should be fitted eccentrically to the shaft.

Although the radial play of the bush need only be small and the sealing arrangements identified above would usually be quite satisfactory, it may be preferable if said bush is sealed to the end plate by an O-ring disposed between radial surfaces of the bush and a flange on the end plate. Said flange may be formed by a pair of half washers retained in a circumferential groove in the end plate by a circlip.

It is preferable if the sleeve positioned on the shaft, after the end plate has been secured to the housing, by inserting a key between the end plate and the flange on the sleeve before the sleeve is secured to the shaft, said key being removed during operation of the seal. In this case the flange may in fact be a collar adapted to secure the sleeve in position on the shaft, the collar being provided with a number of set screws adapted to compress the sleeve onto the shaft.

BRIEF DESCRIPTION OF DRAWINGS

These and other features of the invention are exemplified in the following description of a seal in accordance the invention with reference to the accompanying drawings in which.

BEST MODE OF CARRYING OUT THE INVENTION

Figure 1:
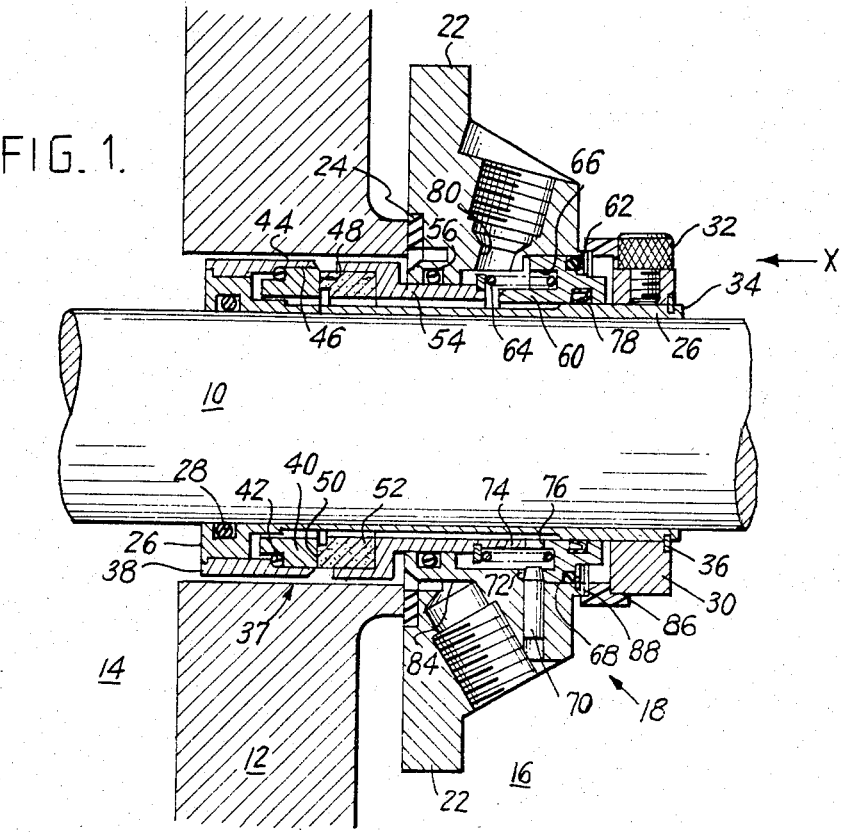
FIG. 1 is a section along line I—I in FIG. 2 through a mechanical cartridge seal embodying the invention and connected to a housing and shaft and FIG. 1a is a partial section through another embodiment.

In the drawing a shaft 10 rotates in a housing 12 the interior 14 of which must be sealed from the exterior 16 to prevent fluid contained under pressure in the housing 12 from escaping. Such a situation is regularly found in fluid pumps and the like where the fluid pressure may vary considerably.

To seal housing 12 and shaft 10 a cartridge type mechanical seal 18 is provided which by means of bolts 20 passing through an end plate 22 of the seal is clamped to the housing 12. A seal 24 seals the end plate 22 with respect to the housing 12.

A sleeve 26 is retained in the end plate 22 by means described further below and is adapted to fit over the shaft 10 and is sealed with respect thereto by an O-ring 28.

The sleeve 26 is clamped to the shaft 10 by a collar 30 which has a number of set screws 32 or similar adapted to press separate fingers 34 of the sleeve 26 against the shaft 10. The collar 30 also serves precisely to locate axially the sleeve 26 on the shaft but when the screws 32 are not tightened the collar 30 is retained on the sleeve 34 by a circlip 36.

The sleeve 26 carries a rotary seal assembly 37 comprising a seal sleeve 38, a seal element 40 and disposed therebetween an O-ring 42. The seal sleeve 38 is an interference fit on the sleeve 26 and has lugs 44 which engage in slots 46 in the seal element 40 to prevent the latter from rotating relative to the sleeve 26. The seal element 40 has an annular seal face 48 which is adapted to run against seal face 50 of a stationary seal element 52 which presses the seal elements 40 against the O-ring 52. Thus the seal element 40 is sealed with respect to the sleeve 26. The stationary seal element 52 is carried in a second seal sleeve 54 to which it is sealed. The second seal sleeve 54 is carried in the end plate 22 and is sealed thereto by an O-ring 56.

A spring 64 disposed in the end plate 22 urges the second seal sleeve 54 towards the first seal sleeve 38 so that, as mentioned above, the two seal elements 40,52 are pressed against each other to form a running seal therebetween.

The spring 64 is carried in an annular slot 66 formed in a close fit bush 60 which is retained in the end plate 22 by a circlip 62. The bush 60 is a close running fit on the sleeve 26 and is provided so that, should the main seal fail between faces 48,50 on seal elements 40,52 respectively, the small gap between the sleeve 26 and the bush 60 will staunch the flow of fluid through the seal until the system is shut down and the seal 18 can be replaced.

The bush 60 is sealed to the end plate 22 by an O-ring 68. It is necessary to prevent the stationary seal element 52 and its sleeve from being rotated by the rotary seal element 40. This has frequently been accomplished in the past by the spring itself or by a pin extending through the end plate 22 and engaging an axial slot in the sleeve 54. However in the first case the spring may not be rigid enough to prevent rotation particularly at start-up when the seal elements 40,52 may be stuck together by the fluid product pressed between them. In the second case the pin tends to wear a circumferential slot across the axial slot and this prevents smooth axial movement of the sleeve 54 which is necessary to take up wear of the faces 48,50 and also for instance axial thermal expansion of the shaft. Thus in the present invention the bush 60 has an axially extending slot 76 (see also FIG. 3) in which a corresponding lug 74 on the sleeve 54 engages. The load on the lug and slot is spread over a larger area and so wear is minimised but even that which does occur does not prevent smooth axial movement of one with respect to the other.

Figure 3:
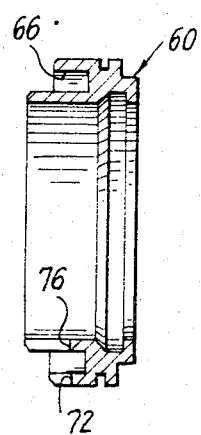

Of course the bush 60 must now be prevented from rotating but because it need not move axially a pin in slot arrangement is quite satisfactory. Thus a pin 70 extends through the end plate 22 and engages in a slot 72 in the bush 60 (FIG. 3).

Figure 2:
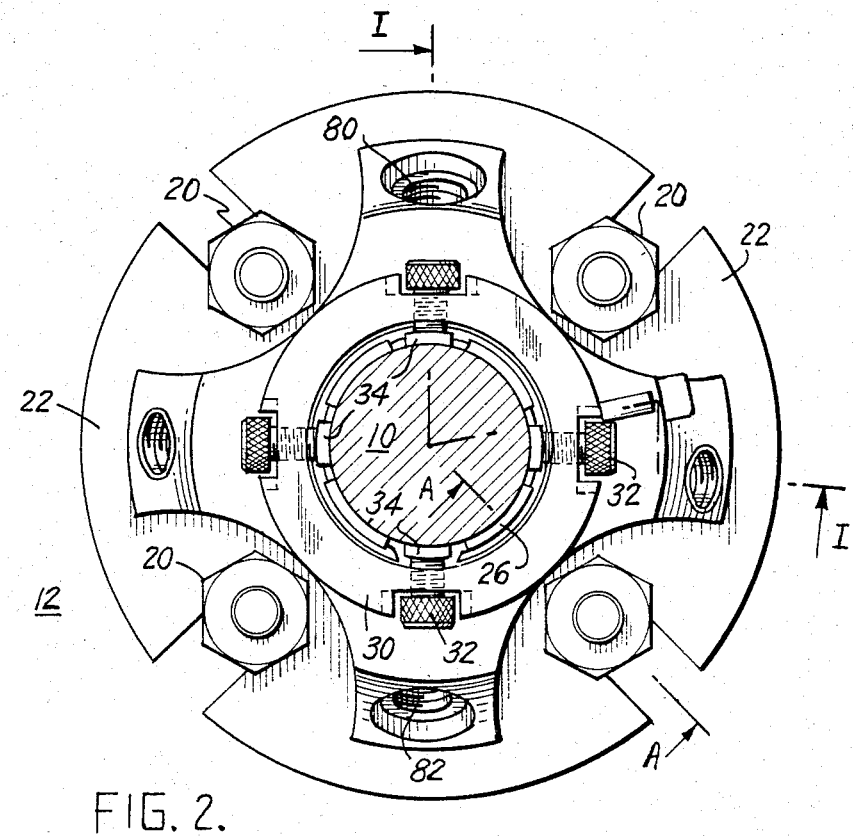
FIG. 2 is an end view in the direction of the arrow X in FIG. 1
Figure 2A:
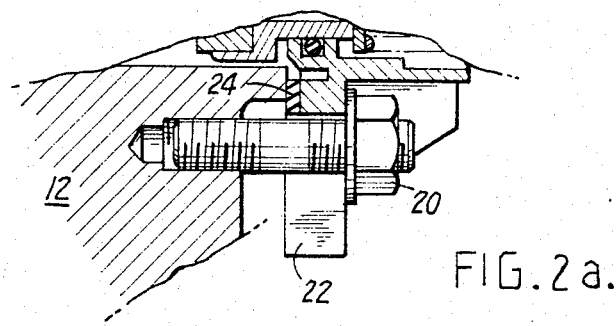
FIG. 2a is a partial section along line A—A in FIG. 2; and, FIG. 3 is a section through a close fit bush as used in the seal shown in FIG. 1.

The bush 60 also carries a lipseal 78 which seal against the sleeve 26 and prevents minor leaks through the main seal 48,50 escaping to the exterior 16. Also it retains a quenching medium should this be required to cool or warm up the sealing surfaces, 48,50 to obtain optimum performance. Such a quenching medium may be fed through aperture 80 formed in the end plate 22 to circulate around the spring 64, under bush 60 as far as the lipseal 78 and under seal sleeve 54 as far as the sealing surfaces 48,50. A further aperture 82 (FIG. 2) may exhaust such medium.

It is also possible to bleed off some of the fluid product through aperture 84 to provide a quenching circulation around the inside of the sealing elements 40,52.

When the seal 18 is being assembled on the shaft 10 and housing 12, the grub screws 32 are loose and the whole assembly 18 is slid onto the shaft 10 until the end face 22 abuts the housing 12. The nuts 20 are then secured. At this stage the sleeve 26 is axially free within small limits on the shaft 10 but to secure it in the correct position on the shaft relative to the end plate several setting keys 86 are inserted between the collar 32 and an end flange 88 on the end face 22. When the collar 32 is pulled into this position it abuts the circlip 36 on the sleeve 26 which is in turn pulled into position. The sleeve 26 pulls the sealing element 40 into contact with sealing element 52, thereby urging faces 48,50 together and also compressing O-ring 42, against the pressure of spring 64. The spring 64 presses the bush 60 against its retaining circlip 62. The grub screws 32 are then tightened and the setting keys 86 subsequently removed. The keys 86 could be in the form of a T-section plastics ring.

It the set screws should ever loosen during service, and to the extent that the sleeve 26 can slide again on the shaft 10, the sleeve and collar may be urged towards the bush 60 by the spring 64. The bush 60 is arranged however to project beyond end flange 88 so that the collar 30 first contacts the bush 60. The bush 60 is made from some spark resistant material such as phosphor-bronze so that with the rubbing of the rotating sleeve with the stationary bush any chance of sparks being generated is minimised.

In FIG. 1 the bush 60 is illustrated as a close fit also in the end plate 22, it being sealed with respect thereto by O-ring 68. The minimum clearance between the bush 60 and sleeve 26 is therefore determined by the likelihood of any eccentricity of either the position of the end plate 22 with respect to shaft 10 or the rotation of the shaft itself. If that clearance is insufficient to accommodate the eccentricity by either cause, particularly when found in combination, then the bush will "pick up" or bind on the sleeve.

Figure 1A:
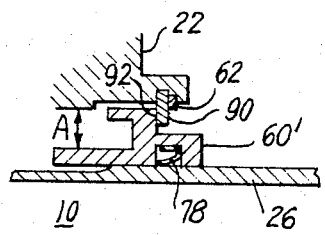

Thus in FIG. 1a the bush 60' is given some radial clearance or float in the end plate 22. If the end plate is inadvertently positioned eccentrically with respect to the shaft the bush 60' will adopt a concentric position on the shaft and hence any eccentricity in the shaft will remain within the tolerance of the clearance allowed between the sleeve and bush. Even if the shaft eccentricity is greater than that clearance the bush can simply oscillate radially as shown by the Arrow A in FIG. 1a.

Moreover if shaft eccentricity is not anticipated, but positioning eccentricity is, then the bush can be arranged as a much closer fit on the sleeve than the FIG. 1 embodiment would normally allow.

While the seal arrangement between the bush and end plate shown in FIG. 1 may be quite satisfactory it may on the other hand be found necessary to move the O-ring 68 into a radial position as shown in FIG. 1a where it is pressed against retaining washer 90. The washer 90 comprises two half washers retained in position by the circlip 62.

From the foregoing it will be appreciated that the close fit bush performs a number of important tasks which hitherto were each performed by separate components.

In the first instance it is a close fit bush thus minimising any leaks which may occur; secondly, it is an antispark device and is so arranged to perform this function if required; thirdly, it is a housing for a lipseal which not only seals the quenching medium but also provides an added dynamic seal in the event of main seal failure; fourthly, it is an anti rotation device for the stationary seal element; and, fifthly it is a sleeve cup for the spring.

Having placed all these functions into one element the design of the remainder of the seal is simplified and if any of these functions should fail it is a simple matter to change just the bush.

I claim:

1. A mechanical seal adapted to seal a rotary shaft (10) exiting a housing (12) containing a fluid product (14) to be retained inside the housing, the seal comprising
   (i) a sleeve (26) adapted to be sealed and secured around the shaft and extending out of the housing (12);
   (ii) an annular rotary seal element (38,40) carried by said sleeve (26);
   (iii) an end plate (22) adapted to surround the sleeve (26) and be sealed and secured to the housing (12);
   (iv) an annular stationary seal element (52,54) carried by said end plate (22); and
   (v) spring means (64) urging said seal elements (40,52) into contact at opposed annular seal surfaces (48,50) to form a running seal therebetween, characterised in that,
   (vi) a multipurpose bush (60) is disposed in the end plate (22) outside of said seal elements (40,52) and which is a close fit on the sleeve (26) to staunch any leak between said seal elements (40,52) and which carries and positions the spring means (64), 2. A mechanical seal as claimed in claim 1 in which the bush (60) is so disposed in the end plate (22) that in the event that the sleeve (26) becomes unsecured from the shaft (10) a flange (30) on the sleeve (26) abuts the bush (60) and is prevented from contacting the end plate (22), the bush being constructed from a spark resistant material.

3. A mechanical seal as claimed in claim 1 or 2 in which said bush (60) is prevented from rotating with respect to the end plate and interlocks (74,76) with the stationary seal element (52,54) preventing said stationary seal element (52,54) from rotating with respect to the bush (60).

4. A mechanical seal as claimed in claim 4 in which a pin (70) extends through the end plate (72) and engages a slot (72) in the bush whereby the bush (60) is prevented from rotating with respect to the end plate (22).

5. A mechanical seal as claimed in claim 1 or 2 in which said bush (60) is a loose fit in a bore of the end plate (22) enabling it to float in the end plate in response to radial movement of the sleeve (26), 6. A mechanical seal as claimed in claim 1 in which said bush (60) carries a lipseal (78) adapted to seal the small gap between the bush (60) and the sleeve (26) and the bush (60) is itself sealed to the end plate (22).

7. A mechanical seal as claimed in claim 1 in which said bush (60) is sealed to the end plate by an O-ring (68) disposed between substantially cylindrical surfaces of the end plate (22) and bush (60).

8. A mechanical seal as claimed in claim 7 in which said O-ring (68) is disposed in a circumferential groove in the bush.

9. A mechanical seal as claimed in claim 5 in which said bush (60) is sealed to the end plate (22) by an O-ring disposed between radial surfaces of the bush and a flange (90) on the end plate.

10. A mechanical seal as claimed in claim 9 in which said flange is formed by a pair of half washers (90) retained in a circumferential groove in the end plate by a circlip (62).

11. A mechanical seal as claimed in claim 9 in which the O-ring is disposed in an annular groove formed in said radial surface of the bush.

12. A mechanical seal as claimed in any one of claims 6 to 11 in which the space defined between the end plate (22) and sleeve (26) and between the seal elements (40,52) and bush (60) is adapted to be filled with a quenching medium supplied through a port (80) formed in the end plate and drained through another port (82) also formed in the end plate (22).

13. A mechanical seal as claimed in claim 2 in which the sleeve (26) is positioned on the shaft (10) after the end plate (22) has been secured to the housing by inserting a key (88) between the end plate and the flange (30) on the sleeve (26) and before the sleeve (26) is secured to the shaft (10), said key (88) being removed during operation of the seal.

14. A mechanical seal as claimed in claim 2 or 13 in which said flange is formed by a collar (30) adapted to secure the sleeve (26) in position on the shaft (10), the collar (30) being provided with a number of set screws (32) adapted to compress the sleeve onto the shaft, 15. A mechanical seal as claimed in claim 1 or 2 in which ports (84) formed in the end plate (22) allow circulation of fluid product (14) over the inside of the seal elements 40,52.

16. A mechanical seal adapted to seal a rotary shaft (10) exiting a housing (12) containing a fluid product (14) to be retained inside the housing, the seal comprising
   (i) a sleeve (26) adapted to be sealed and secured around the shaft and extending out of the housing (12);
   (ii) an annular rotary seal element (38,40) carried by said sleeve (26);
   (iii) an end plate (22) adapted to surround the sleeve (26) and be sealed and secured to the housing (12);
   (iv) an annular stationary seal element (52,54) carried by said end plate (22); and
   (v) means (64) urging said seal elements (40,52) into contact at opposed annular seal surfaces (48,50) to form a running seal therebetween, characterised in that,
   (vi) a multipurpose bush (60) is disposed in the end plate (22) outside of said seal elements (40,52) and which is a close fit on the sleeve (26) to staunch any leak between said seal elements (40,52) and which is so disposed in the end plate (22) that in the event that the sleeve (26) becomes unsecured from the shaft (10), a flange (30) on the sleeve (26) abuts the bush (60) and is prevented from contacting the end plate (22), the bush being constructed from spark resistant material, 17. A mechanical seal adapted to seal a rotary shaft (10) exiting a housing (12) containing a fluid product (14) to be retained inside the housing, the seal comprising (i) a sleeve (26) adapted to be sealed and secured around the shaft and extending out of the housing (12);

(ii) an annular rotary seal element (38,40) carried by said sleeve (26);

(iii) an end plate (22) adapted to surround the sleeve (26) and be sealed and secured to the housing (12);

(iv) an annular stationary seal element (52,54) carried by said end plate (22); and (v) means (64) urging said seal elements (40,52) into contact at opposed annular seal surfaces (48,50) to form a running seal therebetween, characterised in that, (vi) a multipurpose bush (60) is disposed in the end plate (22) outside of said seal elements (40,52) and which is a close fit on the sleeve (26) to staunch any leak between said seal elements (40,52) and which is prevented from rotating with respect to the end plate and interlocks (74,76) with stationary seal element (52,54) preventing said stationary seal element (52,54) from rotating with respect to the bush (60).

* * * * *